United States Patent [19] Byrne

[11] 4,185,196

[45] Jan. 22, 1980

[54] IONIZATION SMOKE DETECTOR HAVING IMPROVED STABILITY AND SENSITIVITY

[75] Inventor: Michael Byrne, Farranshone, Ireland

[73] Assignee: General Electric Company, New York, N.Y.

[21] Appl. No.: 869,304

[22] Filed: Jan. 13, 1978

[51] Int. Cl.[2] ............................................ G01T 1/18

[52] U.S. Cl. ............................................ 250/381

[58] Field of Search ...................... 250/381, 384, 385; 313/54; 340/629

[56] References Cited

U.S. PATENT DOCUMENTS

| | | | |
|---|---|---|---|
| 2,994,768 | 8/1961 | Derfler | 250/381 X |
| 3,233,100 | 2/1966 | Lampart | 250/381 X |
| 3,913,082 | 10/1975 | Hamm | 250/384 X |
| 3,959,788 | 5/1976 | Tipton et al. | 250/381 X |

*Primary Examiner*—Davis L. Willis
*Attorney, Agent, or Firm*—George R. Powers; Carlos Nieves; John F. Cullen

[57] ABSTRACT

An ionization smoke detector is disclosed wherein an electric field is established in an ionization chamber for reducing detector instability caused by air currents acting on the detector. An improved structure for enhancing detector sensitivity by establishing a unipolar region in the chamber is described.

21 Claims, 4 Drawing Figures

IONIZATION SMOKE DETECTOR HAVING IMPROVED STABILITY AND SENSITIVITY

BACKGROUND OF THE INVENTION

1. Field of the Invention

This invention relates to smoke detectors. The invention relates more particularly to an improved smoke detector of the ionization type.

2. Description of the Prior Art

Ionization type smoke detectors are known and have been used as combustion product detectors in home and industrial applications for early warning of fire. The ionization detector includes, generally, an ionization chamber having first and second electrodes, a means for establishing an electric field between these electrodes, and means for causing ionization within the chamber. In one form of detector, ionization is produced by exposing air particles to a radioactive source located within the chamber. Charged particles comprising ions are produced by radiation and an ion current flows between the electrodes.

Detection of airborne products of combustion is provided when these products enter the ionization chamber. A chamber inlet provides access for entry of these products into the chamber. In operation, the charged particles produced by radiation within the chamber establish a quiescent ion current. As combustion products enter the chamber, the charged particles attach themselves to these products and the magnitude of the ion current is reduced. The reduction in ion current amplitude is sensed by circuit means and when the current is reduced to a predetermined level, an electrical signal is generated which initiates a visible or audible warning indication.

Heretofore, the design of ionization smoke detectors has, for practical considerations, required a compromise in certain important characteristics of the detector. One such characteristic is the sensitivity of the detector to the presence of combustion products. A relatively high sensitivity is desirable since it will provide an early warning of the presence of airborne combustion products and provide relatively more time for reacting to a potentially dangerous condition. On the otherhand, ionization detectors have exhibited an instability attributable to air currents which operate to trigger false alarms. Air currents flowing through the ionization chamber carry some of the ions from the chamber and cause a reduction in quiescent ion current which triggers a false alarm. In order to reduce the effect of this instability, the sensitivity of the detector to smoke has been limited by establishing a relatively large, predetermined reduction in the amplitude of ion current before a smoke detection signal is generated. In addition, although it is desirable to provide optimum inlet dimensions to the chamber in order to enhance the capture of airborne products of combustion, the instability caused by air currents has necessitated the use of relatively small or well baffled inlets which limit access to the chamber of airborne combustion products. The sensitivity of the detector to airborne combustion products has thus been reduced in order to enhance the stability of the detector and to avoid the generation of false alarms. It would be desirable to provide an ionization detector wherein the susceptibility of the detector to false alarms caused by air currents is substantially reduced.

It is known that the sensitivity of ionization smoke detectors can be enhanced by establishing a unipolar region within the ionization chamber. The ion current produced by a radioactive source comprises charged particles of opposite polarities. A number of these particles will recombine and reduce the quiescent amplitude of charged particles available for attachment to airborne combustion products. A decrease in the magnitude of ion current in the presence of combustion products is consequently not as pronounced as is desirable and the sensitivity of the detector to those products is accordingly reduced. The provision of a unipolar region within the chamber enhances sensitivity. Charged particles within a unipolar region are of the same polarity and the probability of recombinations within this region is reduced. While prior ionization smoke detection arrangements are known which have provided means for establishing a unipolar region, these arrangements have been relatively complex or relatively costly or both.

SUMMARY OF THE INVENTION

Accordingly, it is an object of the present invention to provide an ionization smoke detector having improved detection stability.

Another object of the invention is to provide an improved method and apparatus for stabilizing an ionization smoke detector with respect to air currents to which the detector is exposed.

Another object of the invention is to provide in an ionization smoke detector a method and means for reducing false alarms caused by air currents.

Another object of the invention is to provide in a smoke detector ionization chamber an improved arrangement for establishing an electric field which varies in intensity in a manner for stabilizing the operation of the detector in the presence of air currents.

Another object of the invention is to provide an ionization smoke detector having improved detection sensitivity.

Another object of the invention is to provide an improved method for establishing a unipolar region in an ionization detector.

Still another object of the invention is to provide an improved ionization smoke detection apparatus having means for establishing a unipolar region within the ionization chamber.

In accordance with a feature of the method of the present invention, an ionization smoke detector is stabilized in the presence of air currents by providing an ionization chamber having an inlet means for enabling airflow into the chamber, providing first and second electrodes for the chamber, positioning a source of radioactivity within the chamber for causing ionization, and establishing an electric field between the electrodes which varies in intensity from a relatively lesser intensity at an interior location in the chamber to a relatively greater intensity at locations within the chamber which are spaced from the interior location.

The apparatus of the invention comprises an ionization smoke detector having an ionization chamber which includes inlet means, first and second electrodes and a means for causing ionization within the chamber. A means is provided for establishing between the electrodes an electric field having an intensity which is relatively lesser at an interior location in the chamber and relatively greater at a location spaced from the interior location. In a particular embodiment of the invention, the electric field of relative less intensity is established in a central region of the chamber.

The provision of a region of relatively greater electric field intensity results in a relatively low ion residence time in this region. At locations where the field intensity is less, the ion residence time will be relatively greater. The effect of air current on the chamber is reduced since air current which can carry ions from the chamber also carries ions from the relatively low intensity field region into the higher intensity region. Ion current is proportional to the product of field intensity and ion density. By providing regions of different intensity and corresponding ion residence time, an advantageous result is the stabilization of average ion current in the presence of air currents.

Sensitivity of the detector is enhanced in accordance with a feature of the method of this invention by providing an ionization chamber, providing first and second electrodes for the chamber, establishing an electric field between the electrodes and supporting a source of radioactivity within the chamber with a body which enables the exposure of a first region of the chamber to direct radiation from the source and inhibits the projection of direction radiation from the source into a second region of the chamber.

In accordance with another feature of the apparatus of the present invention, an ionization chamber for a smoke detector having a unipolar region comprises a chamber having first and second electrode bodies. A third body supports a radioactive source within the chamber at a location intermediate the first and second electrode bodies. The third body is positioned and is shaped for enabling direct radiation from the source into a first region of the chamber and for inhibiting direct radiation into a second region of the chamber. A means is provided for establishing an electric field between the first and second electrodes.

A more particular feature of the apparatus of the invention provides a first electrode body having an elongated annular shaped segment and a closure segment located at one end of the annular segment. The second electrode body has a disc shaped configuration. It is supported within the elongated annular segment and is spaced apart from the closure segment. The disc shaped body includes a centrally located aperture and the third body is positioned in the aperture. The third body supports the radiation source at a location which inhibits the projection of direct radiation in a region intermediate the source and the second electrode body.

The radioactive source causes ionization in the first region of the chamber to provide charged particles of opposite polarity. The second region is a unipolar region through which charged particles of the same polarity flow. Charge recombinations in the unipolar region are substantially reduced and the quiescent current in the chamber is increased. The charged particles of same polarity which flow through the second region are created in the first region, flow from the first region toward the unipolar region, and travel a distance through the unipolar region. During transit in the unipolar region, the probability of recombination of these charged particles is substantially reduced while the probability of contact with smoke particles in this region is increased. Sensitivity of the detector is thereby enhanced. The third support body provides an advantageous method and means for positioning of the source in the chamber and establishing a unipolar region.

BRIEF DESCRIPTION OF THE DRAWINGS

These and other objects and features of the invention will become apparent with reference to the following specification and to the drawings wherein.

DETAILED DESCRIPTION

Figure 1:
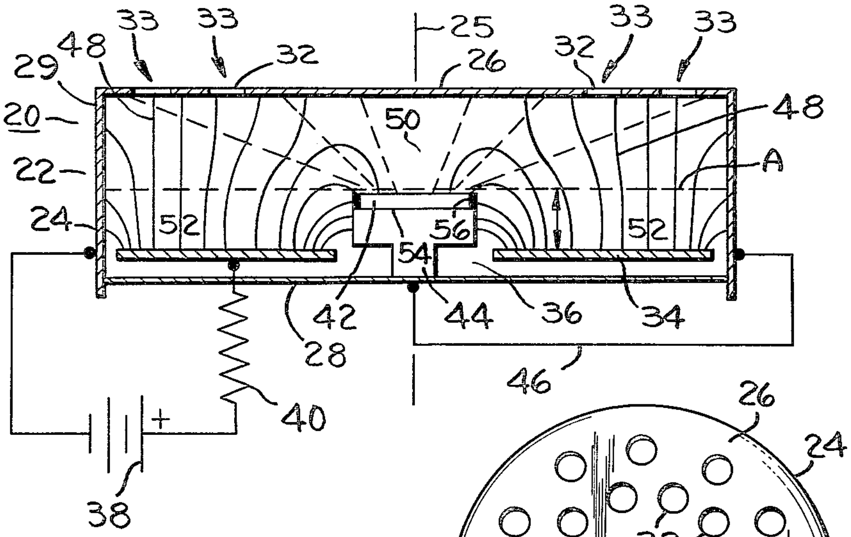
FIG. 1 is a schematic, side elevation view, in section of a chamber for an ionization smoke detector which is constructed in accordance with features of this invention.
Figure 2:
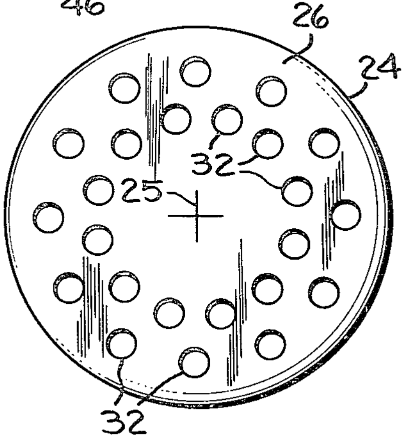
FIG. 2 is a plan view of the chamber of FIG. 1.

Referring now to the drawings, a smoke detector ionization chamber 20 is shown schematically in FIGS. 1 and 2. The chamber is provided by means including a first generally cup shaped electrode body 22 having a segment 24 of annular cross sectional configuration. The segment 24 which is symmetrical about an axis 25 is preferably cylindrical and is elongated in the direction of the axis 25. A closure segment 26 is integrally formed with the segment 24 and is positioned at one end 29 of the segment 24. A second closure means 28 is provided and is positioned at an opposite end of the segment 24.

The chamber 20 includes an inlet means comprising a plurality of circular apertures 32 formed in the closure segment 26. The plurality of apertures 32 are spaced from the centrally located axis 25 toward the annular segment 24 and a periphery of the chamber. These apertures provide a plurality of inlets which enable air to enter the chamber as is represented by the arrows 33. Aerosols and products of combustion are carried by air currents to the smoke detector and into the chamber through the inlet means.

A second electrode comprising a disc shaped body 34 is provided and is positioned in the cylinder within the annular segment 24. The disc shaped electrode body 34, in a preferred embodiment, is circular and includes a centrally located aperture 36 formed therein. The electrode body 34 is spaced apart in an axial direction from the closure segment 26 and in a radial direction from the annular segment 24.

A means for causing ionization within the chamber 20 is provided and comprises a body 42 which is a source of radioactivity such as AMERICUM 241. The body 42 is positioned in and is supported within the chamber by a third body 44. The body 44 positions the radioactive source at a predetermined location between the first and second electrodes within the chamber. In particular, the body 44 positions the radioactive source 42 at an intermediate location in an axial direction between the closure segment 26 and the second electrode 34.

Figure 3:
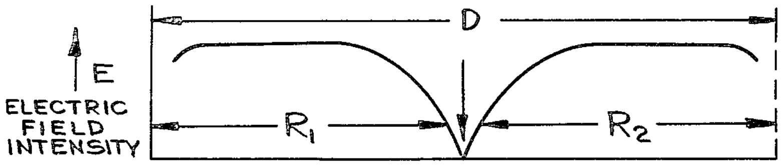
FIG. 3 is a diagram illustrating the field intensity distribution within the chamber of FIG. 1; and, FIG. 4 is a side elevation view, in section, of an ionization chamber for an ionization smoke detector constructed in accordance with the features of this invention.

A means for establishing an electric field between the electrodes 22 and 34 comprises a source of operating potential 38, a reference resistance 40 of relatively high impedance, conductive means for coupling the source of potential 38 and the resistance 40 in series between the electrodes, and a conductor means 46 for coupling the support body 44 to the electrode 22 for establishing a same electrical potential on these bodies. The field establishing means establishes an electric field having an intensity which is relatively less at interior locations near the body 44 and is relatively greater at locations spaced from the body 44. The general configuration of the electric field is illustrated by the field lines 48 of FIG. 1 and by the curve of field intensity of FIG. 3. In FIG. 1, the field lines 48, which substantially represents the path of charged particle flow within the chamber, are shown to bend toward the annular segment 24, extend to the closure segment 26 and to bend and converge toward the support body 44. Since the electrode 22 and the body 44 are maintained at the same potential and since the support body 44 is centrally located within the chamber, the field intensity within the chamber will be relatively low in areas adjacent to the body 44. The curve of FIG. 3, which represents the electric field intensity across the diameter D of the chamber, illustrates a decrease in the field intensity in the central part of the chamber to a value relatively lower than the field intensity at a location spaced radially outward from the axis 25. The provision of a third body 44 within the chamber, which is maintained at or near the same electric potential as the first electrode body 22 provides for a decreasing electric field intensity within the chamber which decreases to a minimum value at the center of the annular shaped segment. In comparison, the electric field intensity is relatively greater in those locations spaced from the body 44.

Ion residence time which is inversely proportional to field intensity is relatively smaller in the region of relatively greater field intensity while a greater ion residence time occurs in the region of lesser field intensity. In FIG. 1, the ion residence time is greater in the central region of the chamber and it is relatively less in the region spaced from the central region of the chamber.

Air currents operating on the ionization chamber flow into the chamber through the apertures 32 of the inlet means. The air current carries charged particles from the chamber. However, the air current will also flow into the central region of the chamber and carry charged particles from locations of relatively low field intensity to those areas of relatively greater intensity thereby replacing ions carried away by the air current. Ion current is proportional to the product of field intensity and ion density. In the central region where the field intensity is relatively low, the ion residence time is relatively large and the ion density is relatively large. Since ions which are carried from the chamber by air currents are replaced to a large extent by ions from the central region, the average ion current in the chamber is stabilized when air currents act on the chamber. The adverse effect on air currents on the ion chamber is thereby substantially reduced.

The sensitivity of the detector is enhanced by providing a unipolar region within the chamber 20. The body 44 positions the radioactive source 42 at a location in the chamber for exposing a first region 50 of the chamber to direct radiation from the source 42 while inhibiting the projection of direct radiation from the source 42 into a second region 52 of the chamber. This is accomplished by the body 44 which positions the source 42 at an axial location intermediate the first and second electrodes and which includes means for inhibiting projection of direct radiation into the second region 52. The body 44 includes a cavity 54 in which the radioactive source 42 is supported and a metal wall segment 56 which inhibits projection of radiation into the region 52 by shielding this region from the source 42. Charged particles will be formed in the region 50 where the existing air particles are exposed to direct radiation from the source. Charged particles of opposite polarity will be created in the region so positively charged particles which are formed in this region are accelerated from this region toward the relatively negative electrode 22. On the other hand, negatively charged particles are accelerated from the region 50 into the region 52 toward the electrode 34. Since charged particles are created only in the region 50, there are relatively few positive ions in the unipolar region 52 and the probability of recombinations by negative ions is substantially reduced. The negative ions transit the space between their source region 52 and the electrode 34. The probability of recombinations in this unipolar region is reduced and the average ion current is increased. Furthermore, during transit between the source region 50 and collector electrode 34, the negatively charged particles travel over a relatively large distance and the probability of contacting combustion products which are present in the unipolar region is increased. The sensitivity of the detector to combustion products is thereby enhanced.

Figure 4:
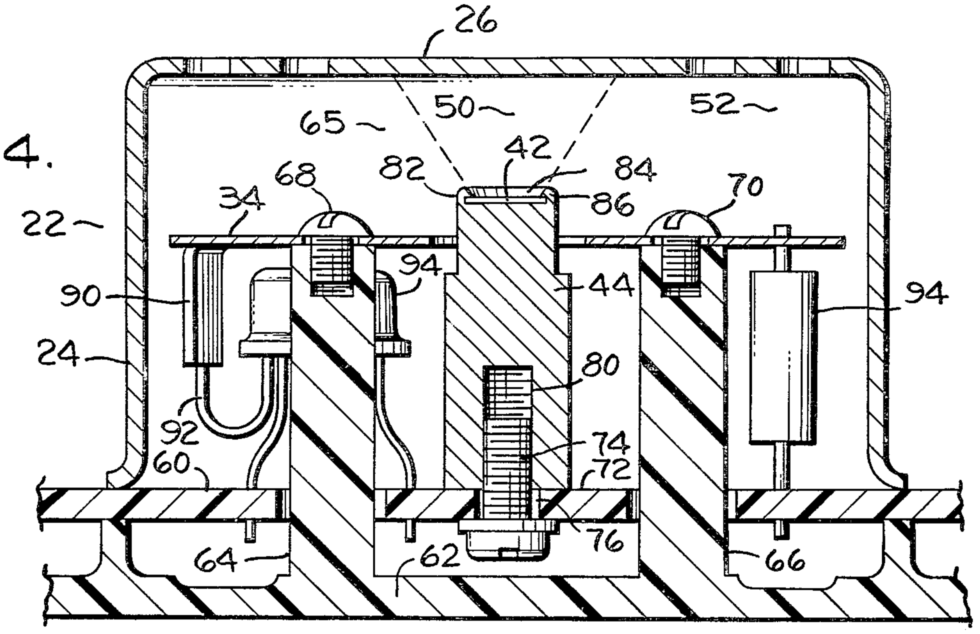

FIG. 4 illustrates a preferred embodiment of the invention. In FIG. 4, those components which perform the same function as components described with respect to FIGS. 1 and 2 bear the same reference numerals. The first electrode body 22 of FIG. 4 comprises a metal body having a cylindrical segment 24 and an integrally formed closure segment 26. The closure segment 28 of FIG. 1 is provided by a printed circuit board 60 and a chamber base support body 62. The chamber base support body 62 is formed integrally with a housing member for the smoke detector. Electrode 34 is circular shaped body and is supported within the chamber on distal surfaces of first and second pillar support means, 64 and 66 respectively, which extend from the base body 62 into the interior 65 of the chamber. The electrode 34 is secured to the pillars 64 and 66 by screw means 68 and 70 respectively each of which engages a bore in the support pillars. The support body 44 comprises a metal, pillar shaped body which is secured to an upper surface 72 of the printed circuit board 60. It is secured by a screw 74 which extends through an aperture 76 in the circuit board 60 and engages a threaded bore 80 in the body 44. The body 44 includes at a distal segment 82, a cavity 84 having an annular extending wall 86. The radioactive source 42 is supported in the cavity 84. It is recessed in the cavity and radiation projects from it in a linear manner into the region 50. The metallic wall 86 inhibits the projection of direct radiation from the body 42 into the region 52 by shielding that region from the direct rays from this source.

A strap 90 is integrally formed in the electrode 34. A conductor 92 of an integrated circuit detector and amplifier chip, which is positioned in a sealed case 94 is coupled to the strap 90. The resistive impedance 40 of FIG. 1 comprises a resistor 94 which is coupled between the electrode 34 and the printed circuit board 60. Printed strips on the circuit board 60 are provided for coupling the resistor 94 and the electrode 22 to the source of operating potential 38. The support post 44 is also coupled to the referenced potential of the electrode 22 by a printed circuit strip formed on a printed circuit board.

An improved ionization smoke detector has thus been described having a chamber wherein a means is provided for inhibiting the adverse affect of air currents on the detector. A means is provided for establishing a field which is relatively lesser at interior locations of the chamber and is relatively greater at locations spaced apart from the interior locations. An improved and relatively simple, noncomplex, and relatively inexpensive means is also provided for controlling radiation within the chamber and establishing a unipolar region in the chamber.

While I have described particular embodiments of my invention, it will be apparent to those skilled in the art that variations may be made thereto without departing from the spirit of the invention and the scope of the appended claims.

What is claimed is:

1. An ionization chamber for a smoke detector comprising:

(a) means providing a chamber, said chamber having an inlet means for enabling an airflow into said chamber;
(b) said chamber having first and second electrodes;
(c) means for causing ionization within said chamber; and,
(d) means for establishing between said electrodes in said chamber an electric field having a relatively lower intensity at interior locations of said chamber and relatively greater intensity at locations spaced from the interior locations.

2. The ionization chamber of claim 1 wherein said relatively lower electric field intensity is centrally located within said chamber.

3. The ionization chamber of claim 2 wherein said first electrode comprises a first body having an elongated, annular shaped segment and a closure segment located at one end of said annular segment, said second electrode comprises a second body positioned within said elongated, annular segment, said second body having a center thereof, and said field establishing means establishes a relatively lower field intensity at said center of said second body.

4. The ionization chamber of claim 3 wherein said closure segment has a center thereof and said field establishing means establishes a relatively lower field intensity at said centers of said closure segment and second body.

5. The ionization chamber of claim 3 wherein said second body comprises a disc shaped body.

6. The ionization chamber of claim 5 wherein said disc shaped body includes an aperture formed therein, a third body positioned within said aperture, and means for maintaining said first and third bodies at a same electric potential.

7. The ionization chamber of claim 6 wherein said third body supports means for causing ionization within said chamber.

8. The ionization chamber of claim 7 wherein said means for causing ionization comprises a radioactive source supported by said third body for projecting radiation therefrom into a limited region of said chamber.

9. The ionization chamber of claim 8 wherein said annular shaped first electrode body segment is cylindrically shaped, said closure segment is equally formed with said cylindrical shaped segment, said disc shaped second electrode is circular shaped, and said field establishing means establishes an electric field having an intensity which decreases between said cylindrically shaped segment and said center of said circular shaped segment.

10. The ionization chamber of claim 1 wherein said chamber inlet means includes a plurality of spaced apart inlets.

11. The ionization chamber of claim 10 wherein said chamber has a periphery thereof and said inlet means are located adjacent to said periphery.

12. An ionization chamber for a smoke detector comprising:

(a) means providing a chamber;
(b) said chamber having first and second electrodes;
(c) a source of radioactivity;
(d) a supporty body for positioning said source at a location in said chamber intermediate said first and second electrodes;
(e) said support body having means for inhibiting the projection of direct radiation from said source into a region of said chamber intermediate said source and one of said electrodes; and,
(f) means for establishing an electric field between said first and second electrodes.

13. An ionization chamber for a smoke detector comprising:

(a) means providing a chamber;
(b) said chamber having first and second electrodes;
(c) said first electrode comprising a first body having an elongated annular shaped segment and a closure segment located at one end of said annular segment;
(d) said second electrode comprises a second disc shaped body positioned within said elongated annular segment and spaced apart from said closure segment;
(e) said disc shaped body having an aperture formed therein;
(f) a third body positioned within said aperture;
(g) said third body supporting a radioactive source in said chamber at a location intermediate said first electrode closure segment and said second electrode body, said third body having means for inhibiting the projection of direct radiation from said source into a region of said chamber intermediate said source and said second electrode; and
(h) means for establishing an electric field between said first and second electrodes.

14. The ionization chamber of claim 13 wherein said third body includes a distal segment which is positioned intermediate said first electrode closure segment and said second electrode, and said means for inhibiting the projection of direct radiation into said intermediate region comprises a cavity formed in said distal segment for supporting said radioactive source.

15. The ionization chamber of claim 14 wherein said third body is formed of a metal and said cavity includes a wall segment thereof which shields said intermediate region from direct radiation from said source.

16. A method for stabilizing a smoke detector ironization chamber in the presence of air currents comprising:

(a) providing an ionization chamber having an inlet means for enabling airflow into said chamber;
(b) providing first and second electrodes for said chamber;
(c) positioning a source of radioactivity within said chamber for causing ionization within said chamber; and,
(d) establishing an electric field between said electrodes which varies in intensity from a relatively lower intensity near an interior location of the chamber to a relatively greater intensity at locations within said chamber spaced from said interior location.

17. The method of claim 16 wherein said chamber has a central region thereof and said field establishing means establishes a field of relatively lesser intensity in said central region.

18. The method of claim 17 wherein said first electrode is formed by a body having an elongated annular segment and a closure segment located at one end thereof, said second electrode is provided by a disc shaped body positioning said disc shaped body within said annular segment, providing a centrally located aperture in said disc shaped body, said radioactive source is positioned by positioning a third body in said aperture for supporting said radioactive source and establishing a same electric potential at said first electrode and at said third body.

19. A method for establishing a unipolar region in a smoke detector ionization chamber comprising:

(a) providing an ionization chamber having an inlet means for enabling airflow to said chamber;

(b) providing first and second electrodes for said chamber;

(c) supporting a source of radioactivity within said chamber at a location intermediate said first and second electrodes on a support body which inhibits projection of direct radiation from the source into a region of said chamber intermediate said second electrode and said source and permits projection of direct radiation from the source into a region of said chamber intermediate said first electrode and said source; and (d) establishing an electric field between said first and second electrodes.

20. The method of claim 19 including providing a first electrode body having an elongated annular segment and a closure segment, providing a second electrode disc shaped body having an aperture formed therein, positioning said radioactive source support body in said aperture and positioning said radioactive source at a location intermediate said closure segment and said second electrode body and said second region is located between said source and said disc shaped body.

21. The method of claim 20 including maintaining said support body and said first electrode at a same electrical potential.

* * * * *